(12) United States Patent
Deus, III et al.

(10) Patent No.: US 6,580,314 B1
(45) Date of Patent: Jun. 17, 2003

(54) DEMODULATION SYSTEM AND METHOD FOR RECOVERING A SIGNAL OF INTEREST FROM A MODULATED CARRIER SAMPLED AT TWO TIMES THE PHASE GENERATED CARRIER FREQUENCY

(75) Inventors: Antonio L. Deus, III, Saunderstown, RI (US); Gerald L. Assard, Waterford, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/685,148

(22) Filed: Oct. 11, 2000

(51) Int. Cl.[7] .............................................. H04L 27/38
(52) U.S. Cl. ........................ 329/306; 359/325; 375/324
(58) Field of Search ................................ 329/304–310; 375/324–327; 359/325

(56) References Cited

U.S. PATENT DOCUMENTS 6,016,117 A * 1/2000 Nelson, Jr. .................. 342/352

* cited by examiner

*Primary Examiner*—David Mis
(74) *Attorney, Agent, or Firm*—Michael J. McGowan; Robert W. Gauthier; Prithvi C. Lall

(57) ABSTRACT

A demodulation system and method is used in a sensor system, such as a fiber optic sensor system, that senses optical signals and modulates a phase generated carrier having a carrier frequency $\omega_c$ to form a modulated carrier. The modulated carrier is preferably undersampled at two times the carrier frequency ($2\omega_c$), thereby maximizing the sensors' demodulated bandwidth relative to the sensors' sampling frequency. The undersampled, modulated carrier is orthogonally demodulated by multiplying the modulated carrier by $\cos(2\omega_c(t_0))$ and $\sin(2\omega_c(t_0))$ to extract even and odd harmonic components of the signal of interest. The even and odd harmonic components of the signal of interest are further demodulated by taking the square root of the sum of squares of the even and odd harmonic components, normalizing the even and odd harmonic components, and differentiating, cross-multiplying and differencing the normalized even and odd harmonic components to recover the signal of interest.

17 Claims, 3 Drawing Sheets

DEMODULATION SYSTEM AND METHOD FOR RECOVERING A SIGNAL OF INTEREST FROM A MODULATED CARRIER SAMPLED AT TWO TIMES THE PHASE GENERATED CARRIER FREQUENCY

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

(1) Field of the Invention

The present invention relates to systems and methods of demodulation and in particular, to a demodulation system and method used in a phase generated carrier system employing quadrature carriers.

(2) Description of the Prior Art

In communication systems, modulation is commonly used to transmit information from an information source, such as a sensor system where information is detected, to an information destination, such as a receiver system where detected signals are received and processed. According to conventional modulation techniques, a signal of interest detected by a sensor modulates a carrier signal by modifying one or more characteristics of the carrier signal, such as amplitude, frequency or phase, to form a modulated carrier signal. The modulated carrier signal is then more easily transmitted over the appropriate communication channels to the destination or receiver system where the modulated carrier signal is demodulated to recover the signal of interest and determine the information.

One type of sensor system that employs modulation techniques includes fiber optic sensors, for example, as used in fiber optic interferometers designed to sense numerous signals. These signals of interest modulate the output phase of the interferometer. In a system having an array of sensors, the signals are often multiplexed, for example, using time division multiplexing (TDM), wavelength division multiplexing (WDM), and/or frequency division multiplexing (FDM).

Such interferometers can be part of a sensor system using phase generated carriers. The sensor time varying phase signal modulates the phase generated carriers to form a modulated carrier. Both the phase generated carriers and the sensor modulation can be mathematically represented as a Bessel series of harmonically related terms. Therefore, the Bessel series of the signal of interest modulates the Bessel series of the phase generated carrier. The number of terms in the Bessel series of the resulting modulated carrier will be dependent upon the level of the measured or detected signal of interest. The harmonically related terms in the Bessel series of the modulated carrier represent both the measured or detected signal of interest and the carrier signal.

The homodyne receiver concept is typically used to demodulate the sensor information or signal of interest from an adjacent pair of carriers. According to prior art demodulation techniques, a quadrature pair of modulated carriers must be multiplied by a local oscillator of the proper frequency, phase and amplitude. Matching the phase of the local oscillator with the phase of the modulated carrier is often tedious and inexact. If either the phase or amplitude are mismatched, the harmonic distortion of the demodulator will be increased.

Typical fiber optic sensor systems using phase generated carriers to transmit a detected or measured signal (i.e., signal of interest) to a receiver system have used a pair of quadrature carriers with frequencies of either $\omega_0(t)$ and $\omega_c(t)$, or $\omega_c(t)$ and $2\omega_c(t)$, where $\omega_c$ is the carrier frequency. In multiplexed sensor systems, the sensor sampling frequency $f_s$ must be selected to ensure that frequencies greater than $f_s/2$ are not aliased into the band of interest below $f_s/2$. In order to satisfy this criteria, sampling must occur at twice the highest bandwidth of interest. For example, a minimum sampling frequency of $4\omega_c(t)$ was employed to reproduce carriers of $\omega_c(t)$ and $2\omega_c(t)$. Thus, previous sampling frequencies in quadrature carrier systems were greater than or equal to four times the frequency of the lowest frequency quadrature carrier. Such a high sampling frequency often places great demands on the sampling circuitry.

U.S. Pat. No. 5,883,548, incorporated herein by reference, discloses a demodulation system and method in which the sampling frequency is lowered to $3\omega_c(t)$. Although this system increased the bandwidth relative to the sensor's sampling frequency, there is still a need to further increase the bandwidth.

Another system and method for recovering a signal of interest from a phase modulated signal using quadrature sampling is disclosed in U.S. Pat. No. 5,923,030, also incorporated herein by reference.

SUMMARY OF THE INVENTION

Accordingly, one object of the present invention is to provide a system and method for recovering a measured or detected signal of interest from the quadrature components of a single modulated carrier.

Another object of the present invention is to maximize the sensors' demodulated bandwidth relative to the sensor system sampling frequency.

The present invention features a system and method of recovering at least one signal of interest that is detected by at least one sensor and that modulates a carrier signal to form a modulated carrier signal having the form $$f(t)=A+B \sin[C_1 \cos(\omega_c(t)+\phi_c)+C_2 \cos(2\omega_c(t)+\phi_c)+(H \cos(\omega_h(t)+\phi(t))))]$$

where A and B are detection factors, $C_1$ is the amplitude of the carrier signal at $\omega_c$, $C_2$ is the amplitude of the carrier signal at $2\omega_c$, $\omega_c(t)$ is the carrier signal radian frequency, $\phi_c$ is the phase of the carrier signal relative to the sensor, H is amplitude of the signal of interest, $\omega_h(t)$ is the radian frequency of signal of interest, and $\phi(t)$ is environmentally induced phase noise.

The method comprises the steps of: receiving the sampled, modulated carrier signal; orthogonally demodulating the sampled, modulated carrier signal by multiplying the modulated carrier signal by cos $(2\omega_c(t_0))$ to extract an even harmonic component of the signal of interest and multiplying the modulated carrier by $\sin(2\omega_c(t_0))$ to extract an odd harmonic component of the signal of interest; and further demodulating the even harmonic component and the odd harmonic component to recover the signal of interest. According to the preferred method, the modulated carrier is undersampled at two times the carrier frequency ($f_s=2\omega_c$).

The step of further demodulating the even harmonic component and odd harmonic component of the signal of interest preferably includes: taking the square root of the sum of the squares of the even harmonic component and the odd harmonic component; normalizing the even harmonic component and the odd harmonic component to form a normalized even harmonic component and a normalized odd harmonic component; and decoding the normalized even harmonic component and the normalized odd harmonic component, to recover the signal of interest. The step of decoding preferably includes: differentiating and cross-multiplying the normalized even harmonic component and said normalized odd harmonic component to form differentiated and cross-multiplied even and odd harmonic components; and differencing the differentiated and cross-multiplied even and odd harmonic components, to recover the signal of interest.

In a system having an array of sensors, the preferred method also includes multiplexing the modulated carrier signals using, for example, time division multiplexing (TDM), wavelength division multiplexing (WDM), frequency division multiplexing (FDM), or a combination of these. According to one embodiment, the sensor includes a fiber optic sensor in an array of fiber optic sensors, such as interferometers. In this embodiment the detection factor A represents the DC level of the light and the detection factor B represents the mixing efficiency of the sensor and the intensity of light.

The system for recovering the signal of interest from the modulated carrier according to the present invention includes sampling and demodulation circuitry for performing the above method.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT

Figure 1:
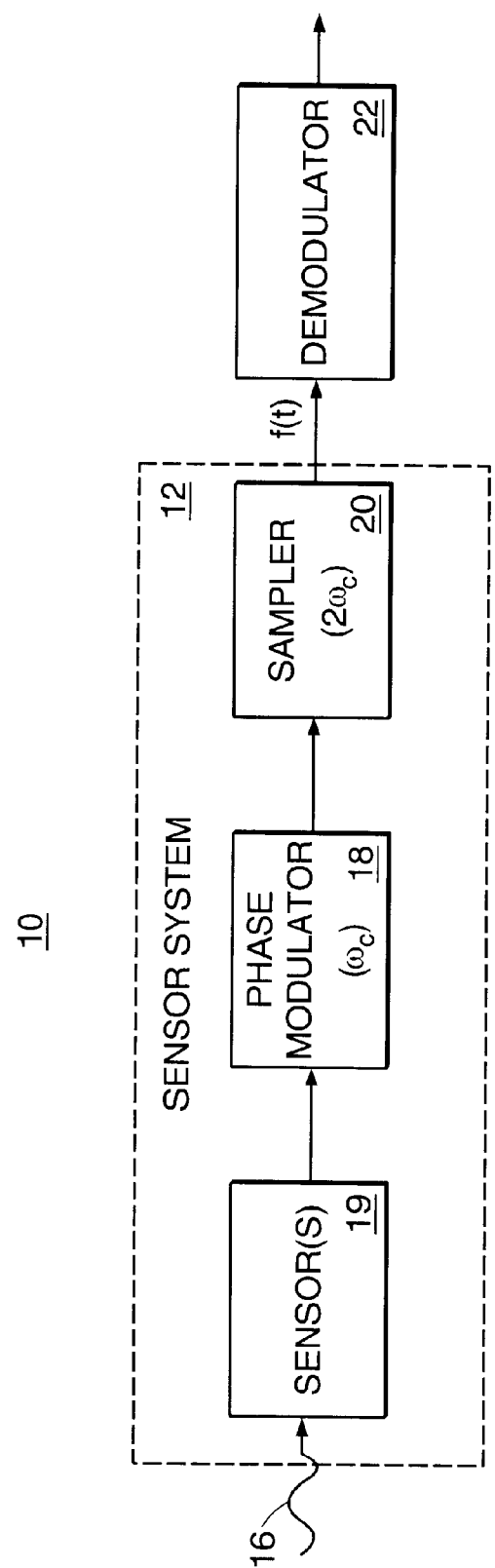
FIG. 1 is a schematic block diagram of a sensor system employing the system and method for recovering a detected signal of interest according to the present invention.

A communications system 10, FIG. 1, employing the demodulation system and method of the present invention includes a sensor system 12 having one or more sensors 19, such as an array of fiber optic interferometers. The sensors 19 sense one or more signals of interest 16. The signal of interest sensed by the sensors 19 modulates a phase generated carrier signal having a carrier frequency ($\omega_c$) generated by a phase modulator 18, to form a modulated carrier signal. In a fiber optic interferometer, for example, the signals of interest modulate the output phase of the interferometer.

When used with an array of fiber optic interferometers 19, the demodulation system and method of the present invention can be used in combination with time division multiplexing (TDM), wavelength division multiplexing (WDM), or frequency division multiplexing (FDM), to sense and transmit a plurality of signals of interest from the array of fiber optic sensors. The present invention contemplates using the demodulation system and method with any system that employs quadrature carriers transmitted, for example, in transmission lines and/or through radio frequency airways.

The sensor system 12 further includes a sampler 20 that samples the modulated carrier signals prior to transmitting the modulated carrier signals to a receiver system or demodulator 22. The sampler 20 samples the modulated carrier signal, preferably at a sampling rate equal to two times the carrier frequency ($2\omega_c$), prior to the demodulation of the modulated carrier signal. In a fiber optic sensor system, the sampler 20 includes a photodetector that converts the optical signal to an electronic signal. The sampled modulated signal is received and demodulated by the demodulator 22 to recover the signal of interest.

Figure 2:
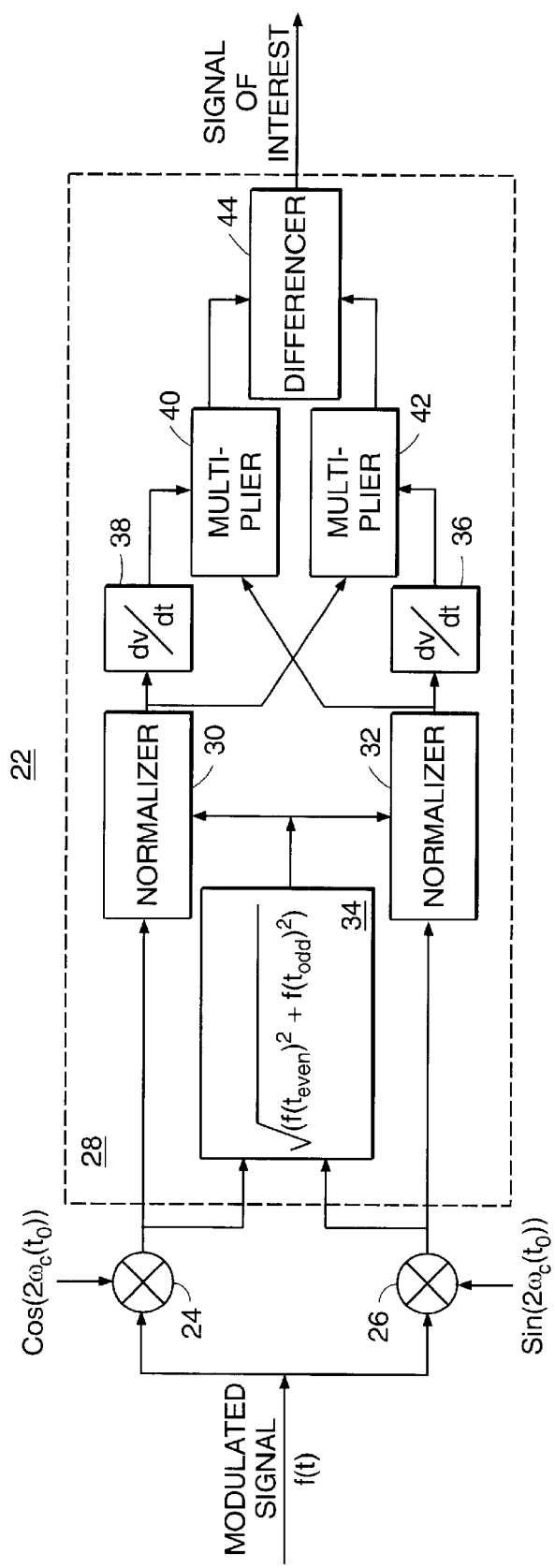
FIG. 2 is a schematic block diagram of a demodulator according to the present invention.

Turning to FIG. 2, the demodulator 22 is shown in greater detail. In the exemplary embodiment, the demodulator 22 includes multipliers 24, 26 to orthogonally demodulate the sampled modulated signal f(t) and includes differentiate and cross multiply (DCM) demodulation circuitry 28 to complete the demodulation process. The first multiplier 24 multiplies the sampled modulated signal by a signal of the form $\cos(2\omega_c(t_0))$ and the second multiplier 26 multiplies the sampled modulated signal f(t) by a signal of the form $\sin(2\omega_c(t_0))$. Local oscillators can be used to provide the signals $\cos(\omega_c(t_0))$ and $\sin(\omega_c(t_0))$. The cosine (cos) and sine (sin) function multipliers 24, 26 extract even and odd harmonic components of the signal of interest $H \cos c\omega_h(t)$ from the phase generated carrier $2\omega_c(t)$, as described in greater detail below.

The DCM demodulation circuitry 28 includes first and second normalizers 30, 32 that normalize the even and odd harmonic components using the square root of the sum of the squares of the even and odd harmonic components as represented by $f(t_{even})$ and $f(t_{odd})$ at 34. The DCM demodulation circuitry 28 further includes first and second differentiators 36, 38, first and second multipliers 40, 42, and a differencer 44 to decode the phase information and complete the recovery of the signal of interest $H \cos \omega_h(t)$. Although the exemplary embodiment shows one type of demodulator circuitry, other analog or digital differentiate and cross multiple decoders, or any other phase generated carrier demodulator, such as an arctangent, can be used.

According to the method of the present invention, the modulated signal f(t) detected from an interferometer based sensor system using a phase generated carrier has the following form:

$$f(t)=A+B \sin[C_1 \cos(\omega_c(t)+\phi_c)+(C_2 \cos(2\omega_c(t)+\phi_c)+(H \cos(\omega_h(t)+\phi(t))))] \quad (1)$$

where A is the DC level of the signal of interest; B is the mixing efficiency of the interferometer and the intensity of the signal of interest; $C_1$ is the amplitude of the carrier at $\omega_c$; $C_2$ is the amplitude of the carrier at $2\omega_c$; $\omega_c(t)=2\pi f_c(t)$, the carrier radian frequency; $\phi_c$ is the phase of the carrier relative to the detector (dependent upon sensor locations); H is the amplitude of the signal of interest; $\omega_h(t)$ is the radian frequency of the signal of interest; and $\phi(t)$ represents environmentally induced phase noise.

The phase modulated signal f(t) can be represented mathematically as a Bessel series. The term $H \cos \omega_h(t)$ represents the signal of interest to be recovered from the phase modulated signal f(t). The phase generated carriers' magnitudes are preferably adjusted so that the magnitude of the second Bessel term of $\omega_c(t)$ is equal in amplitude to the first Bessel term of $2\omega_c(t)$, resulting in equal quadrature carriers at $2\omega_c(t)$. The magnitudes of the first and second Bessel terms can be adjusted by adjusting the magnitude of the phase modulator 18.

The addition of the second Bessel term of $\omega_c(t)$ with the first Bessel term of $2\omega_c(t)$ provides for adding the odd harmonics of $\omega_h(t)$ to the even harmonics of $\omega_h(t)$. Hence all the terms are available for demodulation from $2\omega_c(t)$. The odd carrier's sidebands contain the odd harmonics of $\omega_h(t)$ and the even carrier's sidebands contain the even harmonics of $\omega_h(t)$. These sidebands are orthogonally related and represent the real and imaginary terms of $\omega_h(t)$. The magnitudes of the real and imaginary components of the signal of interest $H \cos \omega_h(t)$ are directly proportional to the magnitudes of their perspective carrier at $2\omega_c(t)$.

Figure 3:
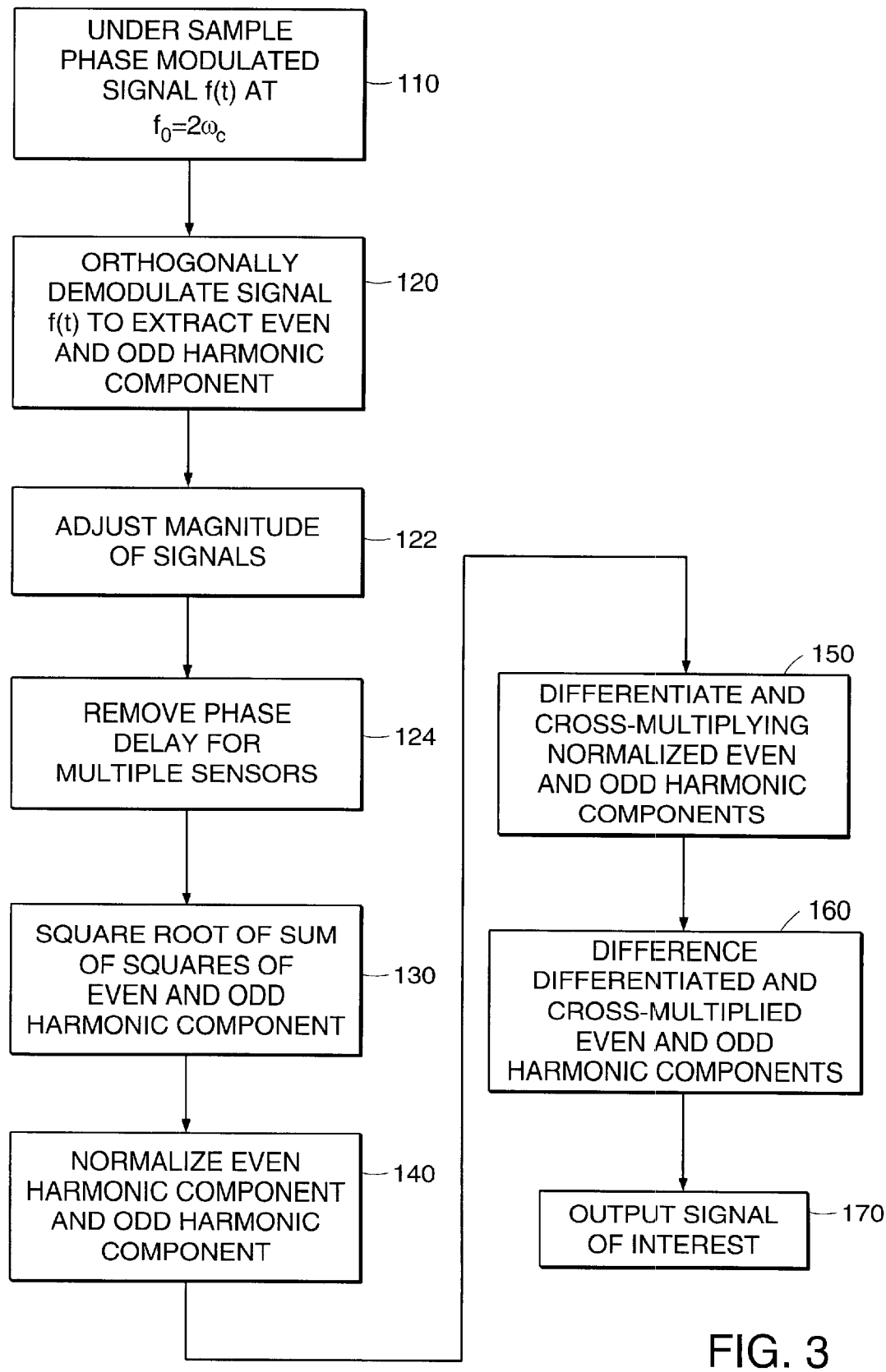
FIG. 3 is a flow chart of the method for recovering the signal of interest from an undersampled, modulated carrier signal according to the present invention.

The demodulation method 100, FIG. 3, according to the present invention, includes sampling a modulated carrier at two times the phase generated carrier frequency $2\omega_c$, step 110. In a fiber optic sensor system, the sampling of the phase modulated optical signal is performed when the optical signal is pulsed (for TDM) or when the optical signal is photodetected and converted to an electronic signal. Since the sampling frequency of previous systems using quadrature carriers was at least $4\omega_c(t)$, the modulated carrier is undersampled at $2\omega_c(t)$. Because of the ordered structure of the Bessel terms in the modulated carrier signal, undersampling at $2\omega_c(t)$ will result in aliasing all of the $\omega_h(t)$ Bessel terms into the baseband of the carrier $2\omega_c(t)$. Thus, both the real and imaginary terms (i.e., odd and even harmonic components) of the signal of interest are available under a single carrier. Having the real and imaginary terms of the signal of interest available under a single carrier, makes the demodulation process less demanding on the carrier's amplitude.

Once the signal f(t) is sampled (e.g., photodetected), it is orthogonally demodulated to extract even and odd harmonic components of the signal of interest, step 120. The orthogonal demodulation step is accomplished by multiplying or mixing the sampled modulated signal by signals having the form $\cos(2\omega_c(t_0))$ and $\sin(2\omega_c(t_0))$. In one example, local oscillators of the same frequency, $\cos(2\omega_c(t_0))$ and $\sin(2\omega_c(t_0))$, can be used to extract the odd and even terms of $\omega_h(t)$ by multiplying the sampled modulated signal by the local oscillator signals using the multipliers 24, 26.

The preferred method further includes adjusting the magnitude of the odd and even harmonic components of the signal of interest $H \cos \omega_h(t)$ during the orthogonal demodulation as indicated at 120. The odd and even components are matched by comparing the magnitude of odd and even (i.e., real and imaginary) components and adjusting or equalizing the magnitude of one or the other to make their magnitudes equal, step 122. Equalizing the amplitudes of the quadrature components insures minimal distortion of the reconstructed or recovered signal of interest.

When multiple sensors are used, the method may also include the step of removing the phase delay caused by the spacing between multiple sensors, indicated at step 124. When employing the demodulation system and method with a multi-element sensor group, the phase of the carrier $\phi_c$ is a function of the time delay due to the spacing of the acoustic elements or sensors relative to the photodetector. The term $\phi_c$ in Equation (1) presents a phase shift in the measured signal of interest $H \cos \omega_h(t)$. This term $\phi_c$ does not have a time variable because the spacing between the multiple elements in the system are fixed. The phase delay is removed by adjusting the phase of the local oscillator signals(e.g., the $\sin(2\omega_c(t))$ and the $\cos(2\omega_c(t))$ signals) to match the phase of the measured signal of interest $H \cos \omega_h(t)$, thereby resulting in zero channel to channel phase delay.

Once the odd and even harmonic components have been extracted with the gains of the odd and even channels matched, the square root of the sum of the squares is calculated, step 130, and used for normalizing the signals step 140, prior to decoding the phase information. The normalized even and odd harmonic components are then differentiated and cross-multiplied, step 150, and differenced, step 160, to further decode and recover the signal of interest, step 170.

Demodulating the undersampled, modulated signal from a single carrier is less demanding because local oscillators of the same frequency can be used to extract the odd and even components of the signal of interest from the single phase generated carrier. In addition to eliminating the need to demodulate two independent carriers, the undersampling also reduces the number of samples that must be processed relative to prior art systems, thereby reducing the demands on the sampling circuitry.

As a result of the undersampling, the processing bandwidth of the demodulation system is equivalent to $f_s/2$. Thus, the demodulation system according to the present invention has a minimum bandwidth increase of 100% by reducing the sampling frequency to $2\omega_c$ from $4\omega_c$ of conventional systems. The $2\omega_c(t)$ approach permits a reduction in sampling rate by a factor of two for a given bandwidth, or an increase in bandwidth by a factor of two for a given sampling rate. Accordingly, the demodulation system and method maximizes the sensors' demodulated bandwidth relative to the sensors' sampling frequency.

In light of the above, it is therefore understood that within the scope of the appended claims, the invention may be practiced otherwise than as specifically described.

What is claimed is:

1. A method of recovering at least one signal of interest $H \cos \omega_h(t)$ from at least one modulated carrier, wherein the signal of interest is detected by at least one sensor and modulates a carrier signal to form the modulated carrier (f(t)) having the form $$f(t)=A+B \sin[C_1 \cos(\omega_c(t)+\phi_c)+(C_2 \cos(2\omega_c(t)+\phi_c)+(H \cos(\omega_h(t)+\phi(t))))]$$

where:
   A, B=detection factors,
   $C_1$=amplitude of the carrier signal at $\omega_c$,
   $C_2$=amplitude of the carrier signal at $2\omega_c$,
   $\omega_c(t)$=the carrier signal radian frequency,
   $\phi_c$=phase of the carrier signal relative to the sensor,
   H=amplitude of the signal of interest,
   $\omega_h(t)$=radian frequency of the signal of interest, and
   $\phi(t)$=environmentally induced phase noise;
said method comprising the steps of:
   receiving the modulated carrier;
   orthogonally demodulating said modulated carrier by multiplying said modulated carrier by $\cos(2\omega_c(t_0))$ to extract an even harmonic component of said signal of interest and multiplying said modulated carrier by $\sin(2\omega_c(t_0))$ to extract an odd harmonic component of said signal of interest; and
   further demodulating said even harmonic component and said odd harmonic component of said signal of interest to recover said signal of interest.

2. The method of claim 1 wherein said modulated carrier has been sampled at two times the carrier signal frequency $(2\omega_c)$.

3. The method of claim 1 wherein:
   said at least one sensor includes a fiber optic sensor in an array of fiber optic sensors;
   A=the DC level of the signal of interest; and
   B=the mixing efficiency of the sensor and the intensity of the signal of interest.

4. The method of claim 3 wherein said array of fiber optic sensors includes an array of interferometers.

5. The method of claim 3 wherein said modulated carrier is photodetected prior to orthogonal demodulation.

6. The method of claim 1 wherein said at least one signal of interest includes a plurality of signals of interest, said plurality of signals being multiplexed from a plurality of sensors.

7. The method of claim 6 further including the step of removing phase delay between said plurality of signals being multiplexed from a plurality of sensors.

8. The method of claim 6 wherein said plurality of signals are multiplexed from said plurality of sensors using at least one of time division multiplexing, wavelength division multiplexing and frequency division multiplexing.

9. The method of claim 1 wherein amplitudes of said even harmonic component and said odd harmonic component of said signal of interest are substantially equal.

10. The method of claim 1 further including the step of adjusting amplitudes of said even harmonic component and said odd harmonic component of said signal of interest to make said amplitudes substantially equal.

11. The method of claim 1 wherein said step of further demodulating includes:

taking the square root of the sum of the squares of said even harmonic component and said odd harmonic component;

normalizing said even harmonic component and said odd harmonic component to form a normalized even harmonic component and a normalized odd harmonic component; and decoding said normalized even harmonic component and said normalized odd harmonic component, to recover said signal of interest.

12. The method of claim 10 wherein said step of decoding includes:

differentiating and cross-multiplying said normalized even harmonic component and said normalized odd harmonic component to form differentiated and cross-multiplied even and odd harmonic components; and differencing said differentiated and cross-multiplied even and odd harmonic components, to recover said signal of interest.

13. A system for recovering at least one signal of interest $H \cos \omega_h(t)$ from at least one modulated carrier, wherein the signal of interest is detected by at least one sensor and modulates a carrier signal ($\omega_c(t)$) to form said modulated carrier (f(t)) having the form:

$$f(t) = A + B \sin[C_1 \cos(\omega_c(t) + \phi_c) + (C_2 \cos(2\omega_c(t) + \phi_c) + (H \cos(\omega_h(t) + \phi(t))))]$$

where:

A, B = detection factors, $C_1$ = amplitude of the carrier signal at $\omega_c$, $C_2$ = amplitude of the carrier signal at $2\omega_c$, $\omega_c(t)$ = the carrier signal radian frequency, $\phi_c$ = phase of the carrier signal relative to the sensor, H = amplitude of the signal of interest, $\omega_h(t)$ = radian frequency of the signal of interest, and $\phi(t)$ = environmentally induced phase noise;

said system comprising:

means for receiving said modulated carrier;

means for multiplying said modulated carrier by $\cos(2\omega_c(t_0))$ to extract an even harmonic component of said signal of interest;

means for multiplying said modulated carrier by $\sin(2\omega_c(t_0))$ to extract an odd harmonic component of said signal of interest; and means for further demodulating said even harmonic component and said odd harmonic component of said signal of interest to recover said signal of interest.

14. The system of claim 13 wherein said means for multiplying by $\cos(2\omega_c(t_0))$ includes a multiplier and a local oscillator.

15. The system of claim 13 wherein said means for multiplying by $\sin(2\omega_c(t_0))$ includes a multiplier and a local oscillator.

16. The system of claim 13 wherein said means for further demodulating said even harmonic component and said odd harmonic component includes:

means for taking the square root of the sum of the squares of said even harmonic component and said odd harmonic component;

means for normalizing said even harmonic component and said odd harmonic component to form a normalized even harmonic component and a normalized odd harmonic component; and means for decoding said normalized even harmonic component and said normalized odd harmonic component, to recover said signal of interest.

17. The system of claim 15 wherein said means for decoding includes a differentiate and cross-multiple decoder, responsive to said means for normalizing, for differentiating, cross-multiplying and differencing said normalized even harmonic component and said normalized odd harmonic component to recover said signal of interest.

* * * * *